Figure 1:
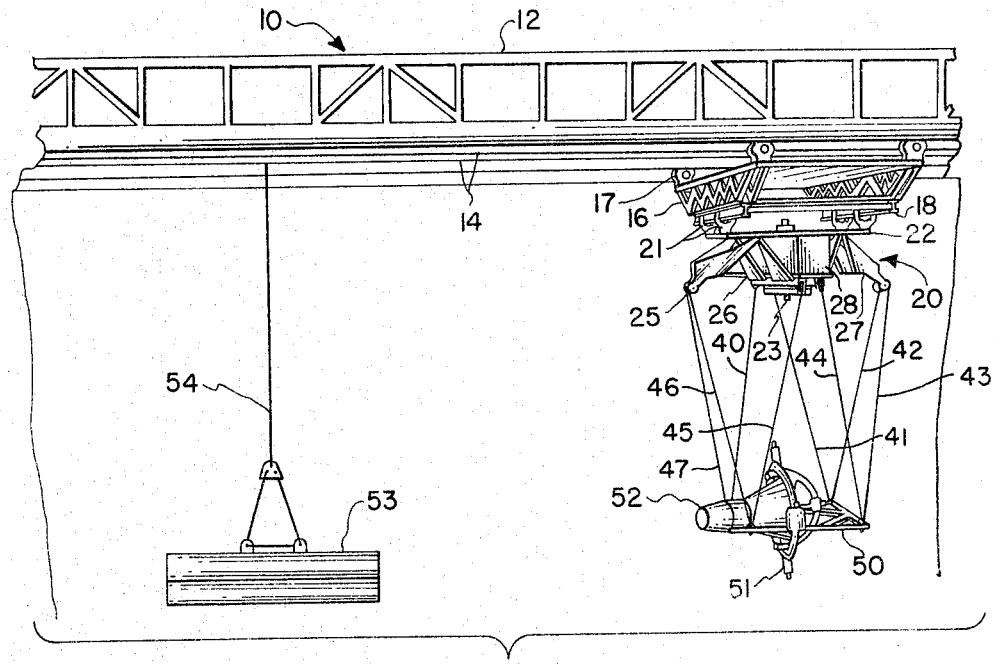

INVENTORS
ARTHUR W. VOGELEY
ROY F. BRISSENDEN

ATTORNEYS

United States Patent Office 3,276,602
Patented Oct. 4, 1966

3,276,602
CABLE ARRANGEMENT FOR RIGID TETHERING
Arthur W. Vogeley, Yorktown, and Roy F. Brissenden, Newport News, Va., assignors to the United States of America as represented by the Administrator of the National Aeronautics and Space Administration
Filed Aug. 6, 1964, Ser. No. 388,024
6 Claims. (Cl. 212—11)

The invention described herein may be manufactured and used by or for the Government of the United States of America for governmental purposes without the payment of any royalties thereon or therefor.

This invention relates to a simplified rigid tethering device, and more particularly to a rigid tethering device for bodies under the influence of any type of force field which tends to separate the bodies. This arrangement allows for freedom of motion in many degrees and over large distances.

Prior art arrangements required rigid truss structures with rails for closure and separation, as well as other complicated stucture. Excessive weight, limited distances of travel, large power requirements, high breakout forces, system lags and rough operation are disadvantages of this arrangement.

A cable and boom arrangement has also been utilized for tethering; however, many of the disadvantages of the truss system also apply to this arrangement. The disadvantages include excessive weight, limited distances of travel, system lags and high power requirements. Also, in the boom and cable arrangement, tethering of the payload or separated body is not usually rigid because the cables are not arranged so as to oppose action of side forces. This is particularly true regarding tethering of separated bodies where motion is required in a direction other than in the plane of the boom.

The invention here under consideration overcomes many of the prior art difficulties by rigidly tethering the separated body with a novel arrangement of cables. The cables are arranged such that they operate in pairs, at least one pair of cables providing effective tethering at intervals of not greater than 45° about the perimeters of the separated bodies. The cables reel up on a large drum to provide closure and separation of the body, requiring very little or no drive power for the linkage itself (i.e. cables). It, therefore, follows that the weight of the system is greatly reduced since the massive truss structure and/or a boom has been eliminated. Obviously, the power required to move the bulky truss structure and/or boom of prior art arrangements is no longer necessary.

It is, therefore, an object of this invention to provide a force separation rigid tethering system which utilizes cables to perform the desired rigid tethering.

Still another object of this invention is to provide a force separation rigid tethering system utilizing cables wherein the cables operate in coplanar pairs, certain of the pairs being parallel, to rigidly tether a payload being accelerated in any direction.

Yet another object of this invention is to provide a force separation rigid tethering system for bodies which is light in weight and requires minimum power for operation.

A further object of this invention is to provide a force separation rigid tethering system for bodies utilizing cables wherein the angle between a suspension cable and a line drawn in the direction of separation is determinative of body acceleration possible while maintaining a rigid system.

Another object of the invention is to provide a force separation rigid tethering system for separated bodies wherein the body is capable of traveling extended distances limited only by the length of the cables.

An additional object of the invention is to provide a force separation rigid tethering system for separated bodies which has immediate response in movement.

Yet another object of the invention is to provide a force separation rigid tethering system for separated bodies which is of simple design, economical to manufacture and easy to maintain.

These and other objects and advantages of the invention will become more apparent upon reading the specification in conjunction with the accompanying drawings.

Figure 2:
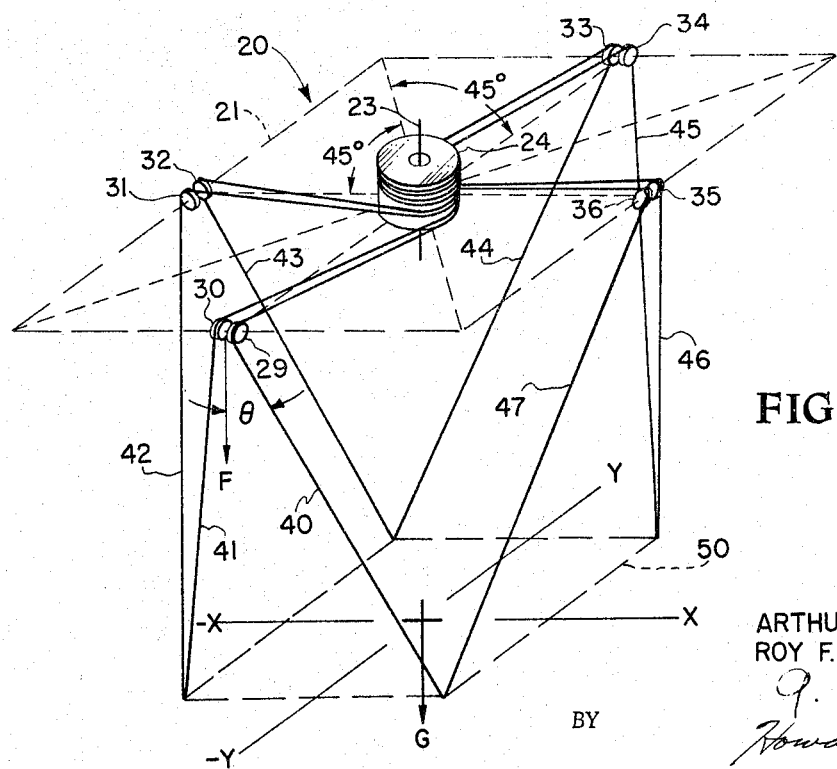

In the drawings:

FIG. 1 is a perspective view of the rigid tethering system showing the system used in conjunction with a rendezvous docking simulator; and FIG. 2 is a schematic view, shown in perspective, of the invention rigid tethering system.

Basically, the invention relates to an arrangement of cables utilized in a manner so as to provide rigid tethering between two bodies held apart by some force such as gravity or centrifugal force. The cables are fixed to the force applying body and entrained over sheaves, the cables being secured at their opposite ends to a winding drum. The winding drum and sheaves facilitate the taking in and the paying out of the cables to extend or retract the suspended body with respect to support structure. Furthermore, these cables are spaced at intervals such that a pair of the cables is operative about the perimeter of the suspended bodies at intervals of not greater than 45°.

Referring now more specifically to the details of the invention, FIG. 1 shows the rigid tethering system as it is associated with a rendezvous docking simulator assembly designated generally by the reference numeral 10.

The assembly 10 includes support structure 12 which may be a truss arrangement or other adequate support structure of conventional design. This particular truss structure 12 supports a pair of parallel spaced rails which carry a truck 16 having roller suspension 17, of known design. The truck 16 in turn supports a pair of parallel spaced tracks 18. These tracks support a carriage 20 having carriage wheels 21 associated therewith. This structure provides means whereby a body suspended therefrom may be capable of moving in the X–Y direction as shown in the FIG. 2.

The carriage 20 also includes a platform 22 which holds a winding drum 24 journaled on a winding drum shaft 23 carried by the platform. The platform 22 supports spars 25, 26, 27 and 28 spaced at 90° intervals thereabout and projecting outwardly and downwardly therefrom. The spar 25 supports a pair of spaced sheaves 29 and 30, the spar 26 a pair of spaced sheaves 31 and 32, the spar 27 a pair of spaced sheaves 33 and 34 and the spar 28 a pair of spaced sheaves 35 and 36.

The tethering cables or lines 40–47 are fixed at spaced intervals about the rack 50 which forms a part of the separated body or load carried by the cables. The point at which the various cables are fixed to rack 50 are intermediate the spars of 25 through 28, this providing line contact with the system at 45 degree intervals when viewing the system in plan view (see FIG. 2). As shown in FIG. 2, the cables 40 and 41 are associated respectively with the sheaves 29 and 30, the cables 42 and 43 with the respective sheaves 31 and 32, the cables 44 and 45 with the respective sheaves 33 and 34 and the cables 46 and 47 with the respective sheaves 35 and 36. Each of the cables are in turn fixed to the winding drum 24 at spaced intervals therealong.

The rack 50 is associated with a gimbal 51 which in turn supports the payload 52. The payload 52 is shown as a space capsule; however, other loads may be utilized and fall within the intended scope of the invention. The separating force for the system shown in FIGS. 1 and 2 is gravity, designated by an arrow and G in FIG. 2. It should also be understood that although a cable and pulley arrangement is shown connecting separated bodies, the principles of the invention have application to separated bodies which are rigidly tethered by cables connected directly to the separated bodies (i.e. separated space capsules in the space environment which are interconnected directly only by cables). With this arrangement the capsules would be rotating, centrifugal force separating the capsules providing the force to keep the cables taut. The truss arrangement 12 also supports via cable 54 a load receptacle 53. In this environment the nose of the body 52 is to be mated with the cylindrical receptacle 53. Obviously, many other uses for the rigid tethering system are apparent.

OPERATION

From the above description of the invention the operation thereof becomes apparent. For example, referring to FIG. 2, if the upper body is moved in a direction tending to cause the platform 50 and load supported thereby to swing in the plus X direction, the cables 40, 45 and 42, 43 come into action and rigidly tether or prevent movement of the platform 50. It should be noted that cables 40 and 45 are coplanar as are cables 42 and 43. The coplanar pair 40 and 45 are also parallel to the coplanar pair 42 and 43, this being true of other cables as can be seen in FIG. 2. Rigid tethering by the various cables results, for attempted swinging movement of the platform in the minus X direction and plus or minus Y direction, as well as, tortional movement. This is also true of attempted diagonal motion, for example, pairs 43, 44 and 40, 47 restrained in a diagonal direction. Force interchanges from cable to cable occur continuously during acceleration of the payload.

Due to the geometric 45 degree interval spacing of the cables of the rigid tethering system the capability of the system can be readily determined. Thus, the angle $\theta$ between a cable and a line drawn in the direction of a separating force F (FIG. 2) is determinative of the payload, etc., acceleration possible while maintaining a rigid system. For example, for operation of a 1 G (gravity) field, the acceleration possible for the system approaches ¼ G, assuming the angle theta is approximately 14 to 15 degrees.

From the above description it is believed clear that the rigid tethering arrangement disclosed herein provides many advantages over the prior art. Among these advantages is the simplicity of the cable arrangement. The cables function essentially as weightless links between the supporting body and the body to be supported. This means that the power requirement for moving the mass of the cables is negligible compared to a rigid truss or boom tethering arrangement. It also follows that the weight of the cable tethering arrangement of this invention is but a small fraction of the weight of the truss or boom structure. Due to the greatly reduced mass of this tethering system, motion response of the load is very good and could be considered immediate in comparison with prior art devices. The distance over which the suspended body may travel is limited only by the length of the cable which is usually determined by the size and shape of the support structure available for holding the cables. This is contrary to prior art devices wherein travel of the payload body was usually limited by the power source available for moving the massive truss or boom arrangement. Since it is not necessary to move massive structure, operation is much smoother due to limited inertial forces.

While a preferred embodiment of this invention has been described, it will be understood that other modifications and improvement sas incorporate the principles of this invention are to be considered as included in the hereafter appended claims unless these claims by their language expressly state otherwise.

What is claimed new and desired to be patented is:

1. A rigid tethering device for force separated bodies comprising: support means; cable means carried by said support means; payload means held by said cable means; force means separating said support means and payload means; said cable means being arranged in pairs such that said support means and payload means as a system are tethered by pairs of cables; each pair of cables attached to said payload at a different common point; and each cable of said pairs of cables attached to said support at a point spaced not more than 45 degrees peripherally from said different common point.

2. A rigid tethering device for force separated bodies comprising: support means capable of moving in two dimensions; cable means capable of moving in another dimension carried by said support means; payload means held by said cable means; force means separating said support means and payload means; said cable means being arranged in pairs such that said support means and payload means as a system being tethered by pairs of cables; each pair of cables attached to said payload at a different common point; and each cable of said pairs of cables attached to said support at a point spaced not more than 45 degrees peripherally from said different common point.

3. A rigid tethering device for suspended bodies comprising: support means; said support means having spars; sheaves carried by said spars; winding drum means carried by said support means for taking in and paying out cable means; cable means entrained over said sheaves and associated with said winding drum; a payload carried by said cable means; and force means separating said support means and said payload means; said cable means being arranged in coplanar pairs; said coplanar pairs being arranged in parallel planes; said support means and payload means as a system being tethered by pairs of cables; each pair of cables attached to said payload at a different common point; and each cable of said pairs of cables attached to said support at a point spaced not more than 45 degrees peripherally from said different common point.

4. A rigid tethering device for force separated bodies comprising: first body means; cable means fixed to said first body means; second body means held by said cable means; force means separating said first and second body means; said first and second body means as a system being tethered by pairs of cables, each pair of cables attached to said second body means at a different common point; and each cable of said pairs of cables attached to said first body means at a point spaced not more than 45 degrees peripherally from said different common point.

5. A rigid tethering device for force separated bodies comprising: support means including a track; a truck carried by and movable on said track; a carriage supported by said truck and movable thereon in a direction other than the direction of movement of said truck; spars forming a part of said carriage; sheaves journaled on said spars; winding drum means located on said carriage means for taking in and paying out cable means in a direction other than the above mentioned directions; cable means entrained over said sheaves and secured to said winding drum means; a payload carried by said cable means; force means separating said payload and support means; said cable means being arranged in pairs and certain of said pairs being parallel to each other; said cable means being fixed to said support means and payload as a system being tethered by pairs of cables; each pair of cables attached to said payload at a different common point; and each cable of said pairs of cables attached to said support at a point spaced not more than 45 degrees peripherally from said different common point.

6. A rigid tethering device for suspended bodies as in claim 5 wherein a cable of said cable means and a line drawn in the direction of force separation form an angle; said angle being determinative of the acceleration capability of the payload within the limits of the rigid tethering system.

References Cited by the Examiner

UNITED STATES PATENTS

| | | | |
|---|---|---|---|
| Re. 22,069 | 4/1942 | Medenwald | 212—126 |
| 2,351,727 | 6/1944 | Wehr | 212—126 |
| 2,358,487 | 9/1944 | Anjeskey | 212—126 |
| 3,032,308 | 5/1962 | Hansen | 254—144 X |
| 3,081,884 | 3/1963 | Minty | 212—126 X |
| 3,179,259 | 4/1965 | McLean | 212—11 |

ANDRES H. NIELSEN, *Primary Examiner.*

SAMUEL F. COLEMAN, EVON C. BLUNK,
*Examiners.*

A. L. LEVINE, *Assistant Examiner.*